United States Patent
Lovett

(10) Patent No.: US 7,543,741 B2
(45) Date of Patent: Jun. 9, 2009

(54) SYSTEM, METHOD AND PROGRAM PRODUCT FOR CREDIT CARD TRANSACTION VALIDATION

(76) Inventor: Robert Lovett, 140 Sherry Lynn Dr., Finger, TN (US) 38334

( * ) Notice: Subject to any disclaimer, the term of this patent is extended or adjusted under 35 U.S.C. 154(b) by 309 days.

(21) Appl. No.: 11/445,553

(22) Filed: Jun. 2, 2006

(65) Prior Publication Data

US 2006/0278697 A1    Dec. 14, 2006

Related U.S. Application Data

(60) Provisional application No. 60/689,576, filed on Jun. 13, 2005.

(51) Int. Cl.
*G06K 5/00* (2006.01)
(52) U.S. Cl. .................... 235/380; 235/382.5
(58) Field of Classification Search ............... 235/375, 235/379, 380, 382.5; 713/182; 705/64
See application file for complete search history.

(56) References Cited

U.S. PATENT DOCUMENTS

| | | |
|---|---|---|
| 5,450,491 A | 9/1995 | McNair |
| 5,789,732 A | 8/1998 | McMahon et al. |
| 5,872,834 A | 2/1999 | Teitelbaum |
| 5,939,699 A | 8/1999 | Perttunen et al. |
| 6,073,840 A | 6/2000 | Marion |
| 6,089,284 A | 7/2000 | Kachler et al. |
| 6,098,879 A | 8/2000 | Terranova |
| 6,116,505 A | 9/2000 | Withrow |
| 6,422,464 B1 | 7/2002 | Terranova |
| 6,442,532 B1 | 8/2002 | Kawan |
| 6,470,233 B1 | 10/2002 | Johnson |
| 6,487,540 B1 | 11/2002 | Smith et al. |
| 6,519,329 B1 | 2/2003 | Hjelmvik |
| 6,529,880 B1 | 3/2003 | McKeen et al. |
| 6,574,603 B1 | 6/2003 | Dickson et al. |
| 6,587,835 B1 | 7/2003 | Treyz et al. |
| 6,678,666 B1 * | 1/2004 | Boulware .................... 705/66 |
| 6,687,346 B1 | 2/2004 | Swartz et al. |
| 6,714,918 B2 | 3/2004 | Hillmer et al. |
| 6,764,003 B1 | 7/2004 | Martschitsch et al. |
| 6,850,901 B1 | 2/2005 | Hunter et al. |
| 6,940,393 B2 | 9/2005 | Dev et al. |
| 6,947,571 B1 | 9/2005 | Rhoads et al. |
| 6,969,002 B2 | 11/2005 | Creamer et al. |
| 6,980,970 B2 | 12/2005 | Krueger et al. |
| 6,991,155 B2 | 1/2006 | Burchette |
| 7,014,109 B2 | 3/2006 | Hjelmvik |

(Continued)

*Primary Examiner*—Kumiko C Koyama
(74) *Attorney, Agent, or Firm*—James Richards

(57) ABSTRACT

A personal card and method of transaction validation for the protection of credit card use in malls, restaurants, telephone and Internet orders and use of ATM. The card generates a coded validation number based on a time code, a cardholder's PIN, and the amount of purchase in accordance with a unique code process for that particular personal card. The coded validation number is different for each transaction to prevent fraudulent use of the validation number. The cardholder provides the merchant the coded validation number in place of the usual static three or four digit verification number now in use. The merchant reports the transaction using normal reporting equipment and processes. The bank then validates the transaction by duplicating the time code and using the known PIN to determine the transaction amount. A method is disclosed to generate a time code by periodically rotating the columns and rows of a two dimensional matrix.

14 Claims, 9 Drawing Sheets

U.S. PATENT DOCUMENTS

| | | |
|---|---|---|
| 7,209,903 B1 | 4/2007 | Mamdani et al. |
| 2001/0051531 A1 | 12/2001 | Singhal et al. |
| 2002/0085515 A1 | 7/2002 | Jaynes et al. |
| 2003/0191945 A1* | 10/2003 | Keech ........................ 713/182 |
| 2004/0024650 A1 | 2/2004 | Chen et al. |
| 2004/0148253 A1 | 7/2004 | Shin et al. |
| 2007/0088624 A1 | 4/2007 | Vaughn et al. |

* cited by examiner

|   | 3 |   | 8 |   | 0 |   | 6 |
|---|---|---|---|---|---|---|---|
| 7 | 6 | 5 | 6 | 1 | 6 | 5 | 9 |
| 3 | 1 | 4 | 9 | 8 | 0 | 4 | 8 |
| 9 | 4 | 6 | 4 | 6 | 3 | 1 | 4 |
| 2 | 8 | 3 | 9 | 5 | 7 | 8 | 0 |
| 3 | 0 | 7 | 2 | 8 | 1 | 6 | 2 |
| 5 | 1 | 9 | 7 | 3 | 9 | 2 | 5 |
| 8 | 5 | 2 | 1 | 9 | 2 | 7 | 3 |
| 6 | 7 | 4 | 5 | 2 | 4 | 9 | 7 |
| 1 | 2 | 1 | 3 | 7 | 5 | 4 | 8 |

50 → (row: 3 1 4 9 8 0 4 8)

|   | 3 | 8 | 0 | 9 |   |
|---|---|---|---|---|---|
| 7 | 6 5 | 6 1 | 6 5 | 8 | |
| 3 | 1 4 | 9 8 | 0 4 | 4 | 50 |
| 9 | 4 6 | 4 6 | 3 1 | 0 | |
| 2 | 8 3 | 9 5 | 7 8 | 2 | |
| 3 | 0 7 | 2 8 | 1 6 | 5 | |
| 5 | 1 9 | 7 3 | 9 2 | 3 | |
| 8 | 5 2 | 1 9 | 2 7 | 7 | |
| 6 | 7 4 | 5 2 | 4 9 | 8 | |
| 1 | 2 1 | 3 7 | 5 4 | 6 | |

SYSTEM, METHOD AND PROGRAM PRODUCT FOR CREDIT CARD TRANSACTION VALIDATION

RELATED APPLICATIONS

This application claims the benefit under 35 USC 119(e) of Provisional U.S. Application 60/689,576, filed Jun. 13, 2005 by Robert Lovett, which is incorporated herein by reference in its entirety.

FIELD OF THE INVENTION:

This invention relates to credit card transactions, and more particularly to the validation of credit card transactions.

BACKGROUND OF THE INVENTION

There have been many attempts to prevent the illegal use of credit cards in shopping malls, by telephone, Internet and especially Automated Teller Machines (ATM).

These efforts include Personal Identification Numbers (PIN) the use of mother's maiden names as a secret identification, and requiring credit card holders to use additional ID cards such as a driver license. All attempts to use static information have drawbacks since they are easily learned and passed on to other users. Once the static identification number is learned, it may be used to make fraudulent credit card purchases until the fraud is detected and the credit card account is closed.

A token-based digital identity device is available from ActivCard of Fremont, Calif. This device generates a one-time-use password and uses a two-factor authentication which requires the user to have the token and know the PIN. Unlike static passwords, the generated dynamic passwords cannot be reused or guessed. ActivCard also provides an ActivCard Mini Token wherein a one-touch, one-time password is generated by pressing a single button on the token device.

SUMMARY OF THE INVENTION

The present invention provides a system, method and program product in which a transaction validation number is generated using a combination of a time value, a PIN and an amount of a purchase in a credit card transaction. The transaction validation number is transmitted by a merchant to a financial institution along with the credit card number and the amount of purchase. The financial institution validates the transaction validation number and approves the transaction only if the transaction is transmitted within a set time from the time transaction validation number was generated.

It is thus an object of the present invention to provide a system that cannot be easily determined, circumvented or passed on to other users.

It is a further object of the present invention to provide a low cost system that is easy to manufacture in large numbers yet customized to each individual user.

It is a further object of the present invention to provide a credit card protection device and method wherein one or more digits are converted into a code which is used to communicate encrypted and/or coded information from the credit card holder via the merchant to the financial institution's credit card authorization central computer.

It is a further object of the present invention to communicate any data transmitted electronically to be encrypted and/or encoded with a shared set of code variables and corresponding code symbols, which provide coded information exchange between a credit card protection device and the credit card authorization centers computer.

It is a further object of the present invention to provide a credit card protection device that is in time synchronization with the credit card authorization central computer.

It is a further object of the present invention to update the time database of the financial institution's credit card authorizing computer each time the credit card protection device is used.

It is a further object of the present invention to provide a means where as each credit card protection device is linked to a single credit card holder with one or more credit cards.

It is a further object of the present invention for the credit card protection device to communicate with the credit card authorization centers computer by telephone using one or more digits.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 4 illustrates the time clock layout of the time clock shown in FIG. 3 with one row selected as a time code;

FIG. 6 is a view of the time clock layout moved two digits right from FIG. 5;

FIG. 7 is a view of the time clock layout moved one digit vertically from FIG. 6;

DETAILED DESCRIPTION OF THE INVENTION

Figure 1:
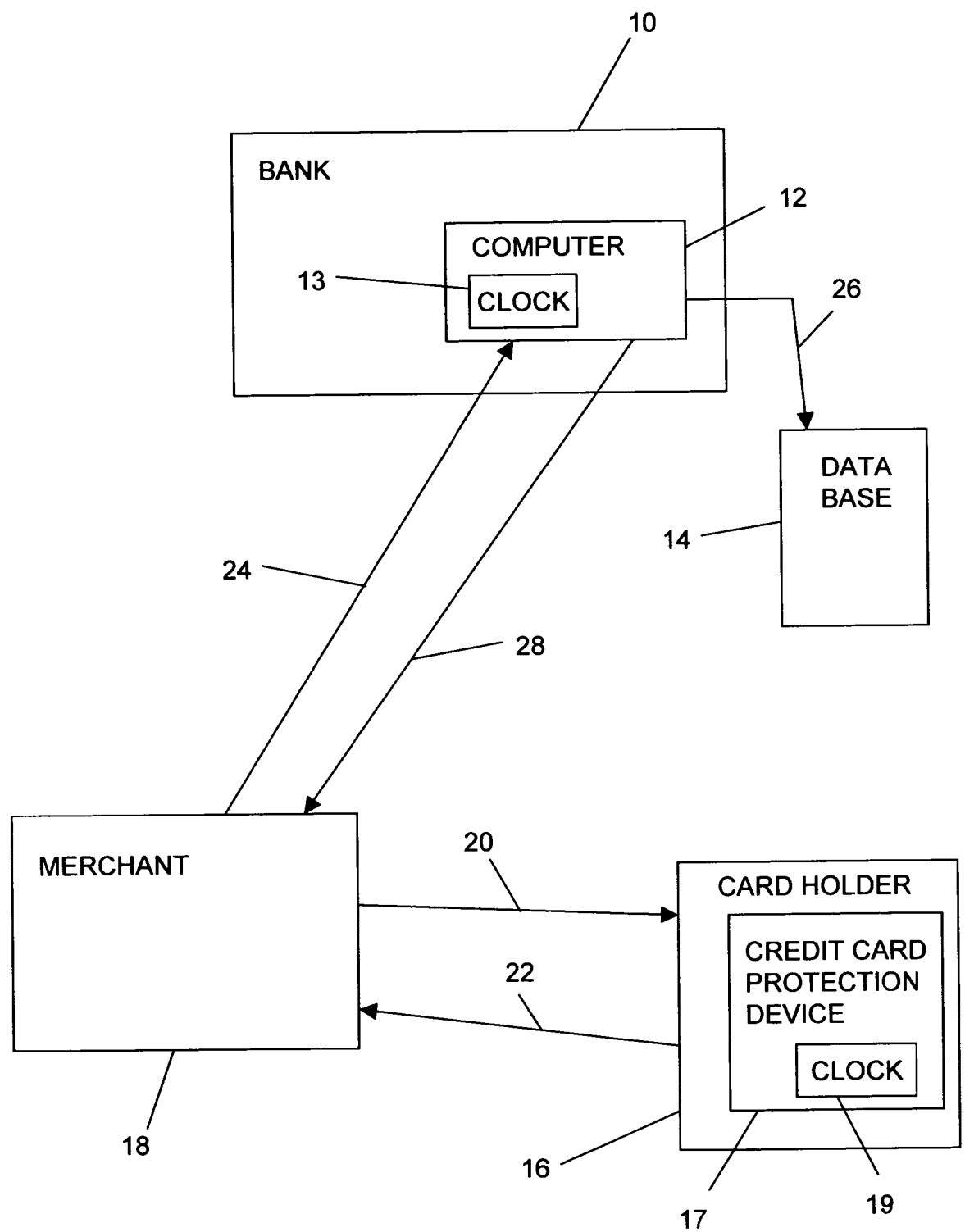
FIG. 1 is a schematic view of a system having a financial institution indicated as a bank, a merchant, and a card holder having a credit card protection device of the present invention.

FIG. 1 is a schematic diagram of a system using the present invention. The system includes a financial institution shown in FIG. 1 and referred to hereafter as bank 10. The bank 10 includes a central computer 12 connected to a database 14 in which credit card accounts are maintained. The computer 12 further includes a clock, which will be discussed later. Also included in the system of FIG. 1, is a card holder 16 whose credit card account is held by the bank 10. The card holder 16 has a Credit Card Protection Device (CCPD) 17 of the present invention to protect the card holder's credit card account and to validate credit card transaction, which will be discussed. The credit card protection device 17 also includes a clock 19 used to validate transactions, as will be discussed. The system of FIG. 1 also includes a merchant 18 who supplies products or services to the card holder 16, and who presents authorized charges to the bank 10 to be charged to the card holder's credit card account.

As illustrated in FIG. 1, the merchant 18 presents at 20, a bill for goods or services to the card holder 16 which includes the amount to be paid by the card holder 16. The card holder 16 enters the amount to be paid into the credit card protection device 17. The credit card protection device 17 then calculates a personal validation number (also referred to as a transaction validation number, personal validation code, validation number, or code in this disclosure) using, for instance, a combination of the PIN of the card holder, the time on the clock 19, and the amount to be paid. The personal validation number is then displayed by the credit card protection device, to be discussed. The card holder then presents the merchant with the holder's credit card and the personal validation number at 22.

The merchant 18 then sends the credit card number of the card holder 16, the amount charged, and the personal validation number, along with any other information needed to complete the transaction, to the bank 10 at 24. The bank 10 receives the data sent by the merchant 18, finds the account information for the credit card number in the database 14 for the card holder 16, and using the PIN from the database 14 and the amount reported by the merchant at 24, calculates the clock reading for the clock 19. The bank 10 then compares the calculated clock reading with the bank clock 13. If the two values are within a set range, such as, for instance, 5 minutes, the transaction is approved and an approval is sent from the bank to the merchant 18 as shown at 28, and the transaction is complete. A clock correction value may optionally be entered in the database for the card holder, if desired, to keep the bank clock 13 and the credit card protection device clock 19 in synchronization, as will be discussed.

The credit card protection device 17 is similar in size to a standard credit card with one or more clock 19, batteries, microprocessors, electronic circuitry, and Liquid Crystal Display (LCD) bonded inside a plastic housing during manufacturing to prevent contamination and interrogation.

The credit card protection device 17 has many components similar to a standard clock/calculator except the credit card protection device's circuitry is all interconnected. With a data entry means (11 numeric keys and three function keys).

Figure 2:
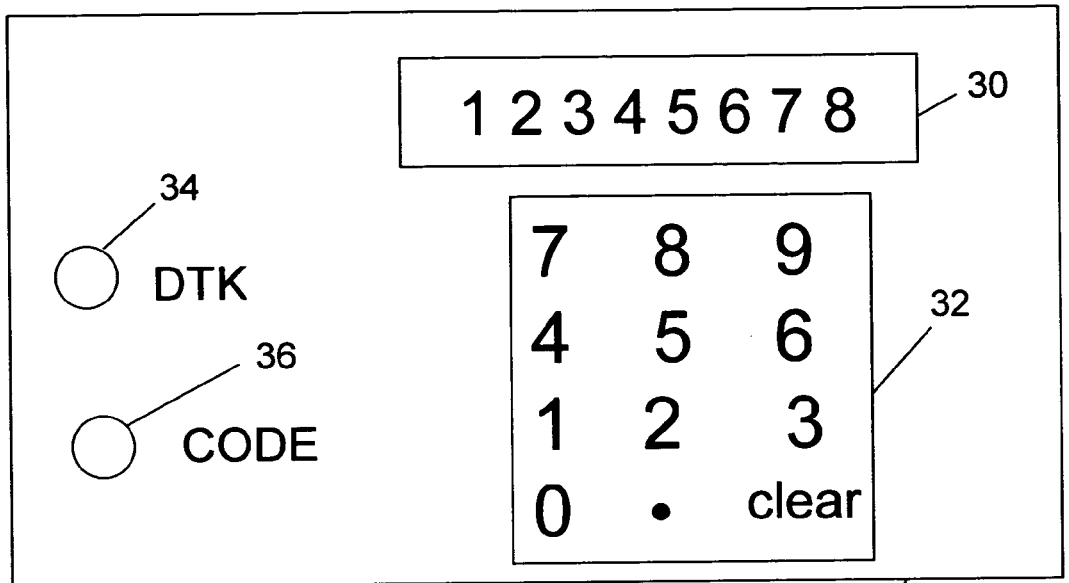
FIG. 2 is a front view of the credit card protection device of FIG. 1.

FIG. 2 is a front view of the credit card protection device 17. The device 17 has an LCD display 30, a keypad 32 for entering numeric numbers and a clear function, a Duplicate Transaction Key (DTK) 34, and a Code Key 36.

Figure 3:
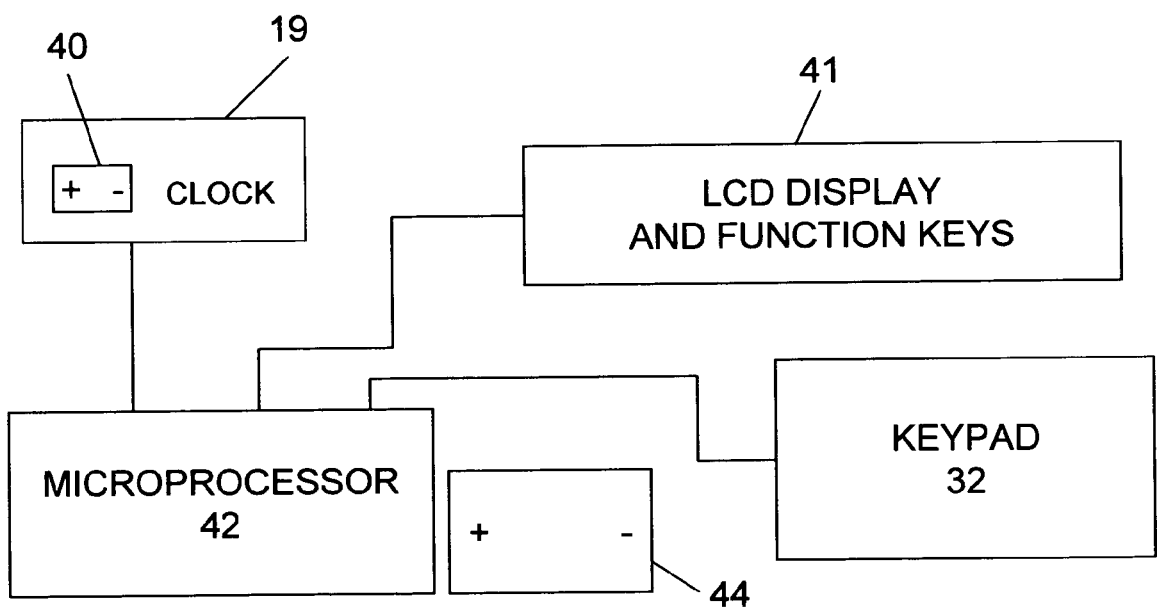
FIG. 3 is a schematic diagram of the credit card protection device of FIG. 1 including a time clock, an LCD display and function keys, a microprocessor, a keypad, and batteries.

FIG. 3 is a schematic diagram of the credit card protection device 17 and includes a clock 19, a clock battery 40, LCD display and function keys, the keypad 32, a microprocessor 42, and a battery 44. The clock battery 40 is sealed in the device 17 and is designed for long life, while the battery 44 is a replaceable battery for operating the microprocessor 42, the keypad 32 and the LCD and function keys 41.

Figure 4:
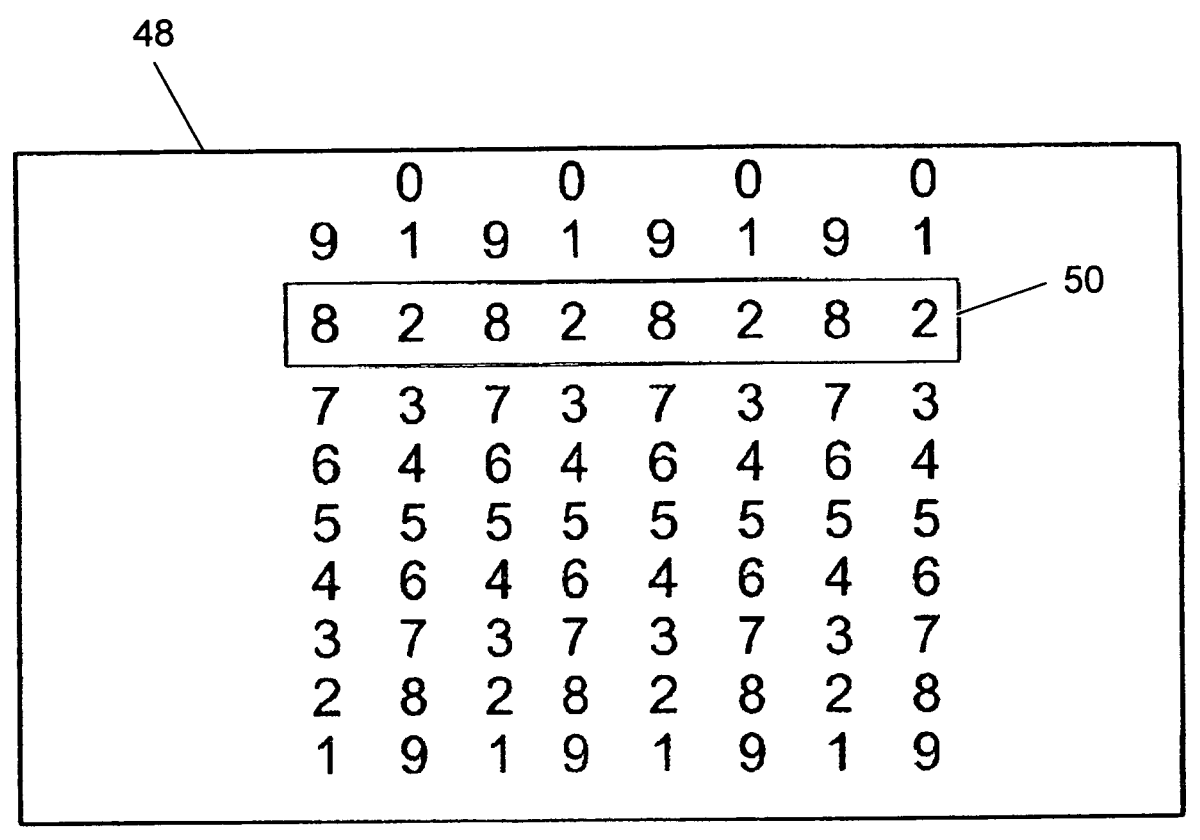

FIG. 4 illustrates the clock layout 48 of the clock 19 and includes four columns or a matrix of two digits each. These four columns will be made up of hours, minutes, seconds and days. The left column will contain only 1 through 9 and the second or right column will contain 0 through 9. If a zero is in the left column then subtraction will not be possible in some cases. Other arrangements are possible such as three or four digits wide. One row 50 is used as the time code for the code number calculation, as will be described.

There are a large number of different models of the credit card protection device 17, each fabricated with a large number of different clock speeds. One clock runs at 20 cycles per minute and 80 minutes per hour. Another runs at 400 cycles per minute and 122 hours per day. The difference in clock speeds and the large number of clocks only magnifies the unique locations possible for each credit card holder 16. An extremely large clock database is preferred for global utilization.

During the credit card protection device's manufacturing process each card 17 will be temporarily identified until the bank assigns the card to a credit card holder, at which time the bank will remove that identification and input that model number into the banks computer database 14. Only the bank will know the model number issued to each card holder since there will be one common housing.

This identification allows the bank's computer 12 to know what speeds and model number each card holder 16 has been issued.

The LCD can be turned on by pressing the code key 36. No information will be visible when it is first turned on. If a mistake is made while entering digits, the clear key will erase them. The dollar value can be from $1.00 up to $9999.99. After the card holder 16 types in the proper PIN such as the last four digits of the card holder's social security number, and presses the code key, the LCD will blink awaiting the merchant's dollar value to be entered. The credit card protection device 17 will then return a code after the merchant's total dollar value is entered. Once the code key has been pressed, there will be a minimum of one minute span before any additional codes can be generated. This will prevent anyone from bombarding the card with random digits trying to illegally or fraudulently use the credit card protection device.

The clock 19 (based on the model number) will rotate for some time period then rotate back to the original position then increment for some number of seconds, minutes, hours and/or days then start a new rotation known only by the bank's computer system 12. This rotation can take many forms such as the left columns will rotate clockwise and the right column counter clockwise (similar to the wheels of a slot machine). One or more columns will rotate each minute insuring a unique set of codes for each credit card purchase. Additionally, the matrix pattern 48 could rotate both left and right at the LCD location 50 one or more numbers to prevent illegal or fraudulent use. For instance, in the time code 50 of FIG. 6, the number shown is moved two digits right from the number shown at 50 in FIG. 5. Further, the last digit 69 of the time code at 50 in FIG. 7 has been moved one digit vertically from the time code 50 of FIG. 6.

To further increase the number of unique clock location possibilities, the card holder 16 may be required to type in the last four digits of the card holder's social security number, the proper birth year, or some other piece of information that the card holder will not readily forget or someone else can not easily guess as an algorithm seed.

The clocks synchronization can be accomplished by analyzing the merchant's dollar value each time the credit card protection device is used. The merchant's price will be presumed to be accurate and legitimate, thus the time can be set by those values unless they are in conflict with credit card protection device 17 by a larger margin than expected by the banks computer 12. During this synchronization process, the bank's computer 12 will keep a history on each credit card protection device 17 and its model number in order to best predict its time drift at its next use.

When a customer requests a credit card from a bank, a credit card will be issued along with a credit card protection device 17. The bank 10 will install an external battery 44 to power the LCD and function keys 41 and a second clock/microprocessor 42 used for calculations. The time can then be set by pressing a code on the keypad known only by the bank. The time can be set to some unique location for each card holder even though they may have the same model credit card protection device. Before using the credit card the card holder will be instructed to call a bank telephone number to authorize that card. Once the credit card has been authorized, the card holder will be instructed to call another bank number to authorize the credit card protection device 17. During that telephone call, the user will be instructed to press the code key which will turn the credit card protection device on then press their four digit PIN on the credit card protection device keypad such as their birth year or other information which the banks computer is privy to from their credit card application then press the code key. The LCD 30 will display a code that the user will be instructed to enter into the telephone keypad.

These numbers will activate the credit card protection device 17 and insure that the correct card holder has possession. This activation will also confirm that the credit card protection device is in time synchronization with the bank's computer 12 and record any time drift since the bank mailed the credit card protection device 17 to the card holder 16.

If the card holder 16 should lose the credit card protection device 17, the card holder will call the bank and the credit card protection device is invalidated in the banks database 14. A new credit card protection device 17 is then issued to that card holder, making the replacement of credit cards unnecessary.

If someone finds the lost credit card protection device 17 and one or more credit cards, the finder or fraudulent user will be unable to access the credit card account since they must have knowledge of the PIN discussed, and that PIN must be entered into the credit card protection device prior to its use and acceptance by the bank's computer 12. After some number of failed attempts to fraudulently use the credit card protection device 17, the bank's computer 12 will temporary disable or flag the account in the bank's computer database 14 until the rightful owner calls to report a loss or correct a mistake. If someone tries to fraudulently use the credit card protection device 17 it will give no indication to the user until the banks processing center rejects the purchase back to the merchant which will take time and alert the bank to a possible fraudulent attempt.

Each time the credit card holder 16 uses their credit card they will get a total dollar amount that the merchant 18 will charge to their account. They will press the code key 36 on their credit card protection device 17 which will turn it on then enter their PIN such as their birth year and then press the code key 36. The LCD 30 will then blink indicating that the user can input the total dollar value from the merchant 18. The card holder 16 will then input the total dollar value from merchant 18 and press code key 36. The credit card protection device LCD 30 will display a four digit code which the card holder must give to the merchant to complete the transaction.

Only the dollar amount (no decimal and no cents) up to the first four digits will be used by the credit card protection device 17, even though the public will input the total dollar value such as $149.95 which will be read by the credit card protection device 17 as 149.

EXAMPLE 1

| | |
|---|---|
| Card holders PIN | 2319 |
| Total dollar merchant will charge holder | + 149. |
| | = 2468 |

Figure 5:
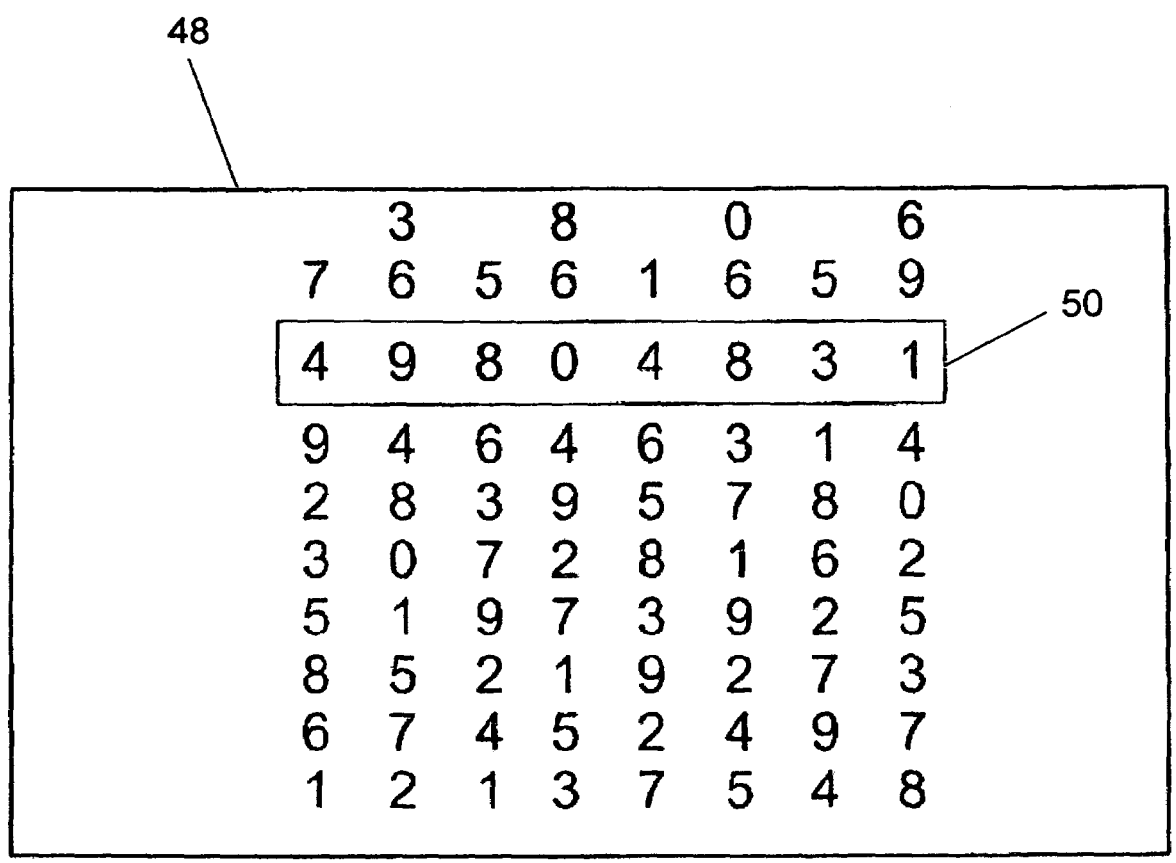
FIG. 5 is a view of the time clock layout of FIG. 4 with a randomly selected time code.

Card holders time location in credit card protection device FIG. 5:

| | |
|---|---|
| | 49 80 48 31 |
| Minus credit card protection device LCD code | − 2 4 6 8 |
| Code given to merchant | = 7 6 2 3 |

The code number 7623 will appear in the LCD readout which the card holder will give to the merchant. The merchant must forward that code along with the card holder's credit card number to the banks authorization center during the transaction. The merchant cannot decrypt or decipher that code. The bank will move to that card holder's location in the time database and perform the same operation that the card holder performed earlier using the code rather than the price that the merchant sent with the card holder's credit card number for authorization.

| | |
|---|---|
| Card holders time location at bank | 49 80 48 31 |
| Minus code from merchant | − 7 6 2 3 |
| | = 2 4 6 8 |
| Minus Card Holders PIN | 2 3 1 9 |
| Actual Amount Card Holder authorized | 1 4 9 |

The actual $149. price that the bank processing center derived from card holder's code matches the reported price that the merchant sent to the bank for authorization. This is a legitimate sale by the merchant and will be authorized.

EXAMPLE 2

| | |
|---|---|
| Card holders PIN | 2319 |
| Total dollar merchant will charge holder | + 1127. |
| | = 3446 |

Card holders time location in credit card protection device (FIG. 6):

```
                                              31 49 80 48
Minus credit card protection device LCD code  -3  4  4  6
Code given to merchant                       = 8  5  6  2
```

The code number 8562 will appear in the LCD readout which the card holder will give to the merchant. The merchant must forward that code along with the card holder's credit card number to the banks authorization center during the transaction. The merchant cannot decrypt or decipher that code. The bank will move to that card holder's location in the time database and perform the same operation that the card holder performed earlier using the code rather than the price that the merchant sent with the card holder's credit card for authorization.

```
Card holders time location at bank      31 49 80 48
Minus code from merchant                -8  5  6  2
                                      = 3  4  4  6
Minus Card Holders PIN                   2  3  1  9
Actual Amount Card Holder authorized     1  1  2  7
```

The $1127. price that the bank processing center derived from card holder's code does not match the same price of $1800. that the merchant sent to the bank for authorization. This is not a legitimate sale by the merchant and this transaction will not be authorized.

EXAMPLE 3

Use at ATM

The card holder will enter their PIN into credit card protection device 17 using the keypad 32.

The credit card protection device LCD 30 will blink awaiting the dollar amount.

The card holder enters the dollar amount that they wish to withdraw into the keypad 32 and then press the code key 36. The card holder enters that code from the LCD 30 into the ATM keypad, then the transaction is completed and the card holder receives the requested money from the ATM.

Due to rush hour business, personnel shortages and online outages there will be times when the first transaction will fail. If the merchant should ask for a second code then the card holder will press the code key to turn the credit card protection device 17 on and then press the Duplicate Transaction Key (DTK) 34 which will alert the banks computer authorization center that this is not a duplicate order. By pressing the DTK, this will move the card holder's time to a new location known only by the banks computer, therefore creating a new code to complete the transaction.

Example of a legitimate remote purchase by phone/internet:

Card holder buys an item from the merchant by phone for $149.95 and gives merchant a code number 4481 which authorized bank to pay merchant $149.95

Ten minutes later the card holder decides to purchase the same item for a friend. Card holder calls same merchant and gives merchant a second code number 3501 which contains an encrypted message to bank agreeing to pay $149.95 to merchant. Merchant ships both purchase orders to card holder. Card holder will be billed for two items at $149.95 each.

Example of an invalid remote purchase by phone/internet:

Card holder buys an item from merchant by phone for $245.16 and gives merchant a code number 1738 which authorized bank to pay merchant $245.16.

Ten minutes later the merchant calls card holder and informs them that the bank would not authorize the purchase. It's possible that the merchant waited more than the five minutes allotted by the bank to complete each transaction. It's also possible that the merchant wants to double charge the card holder. The card holder gives the merchant a new code 8315 which will allow the merchant to complete the authorization with bank.

The card holder places a flag inside code 8315 by pressing the DTK key 34 informing the bank that this is not a duplicate order. The bank will then look at he card holders records and if the merchant has billed the card holder for that same amount using code 1738 placed earlier then the bank will place a hold on that merchants account and a fraud investigation is started . . .

The bank's computer 12 will keep track of all fraudulent attempts by the credit card protection device 17 and associated credit card numbers.

In a broad aspect, this invention relates to a credit card protection device that can be identically mass-produced, yet be individualized for each credit card holder.

Figure 8:
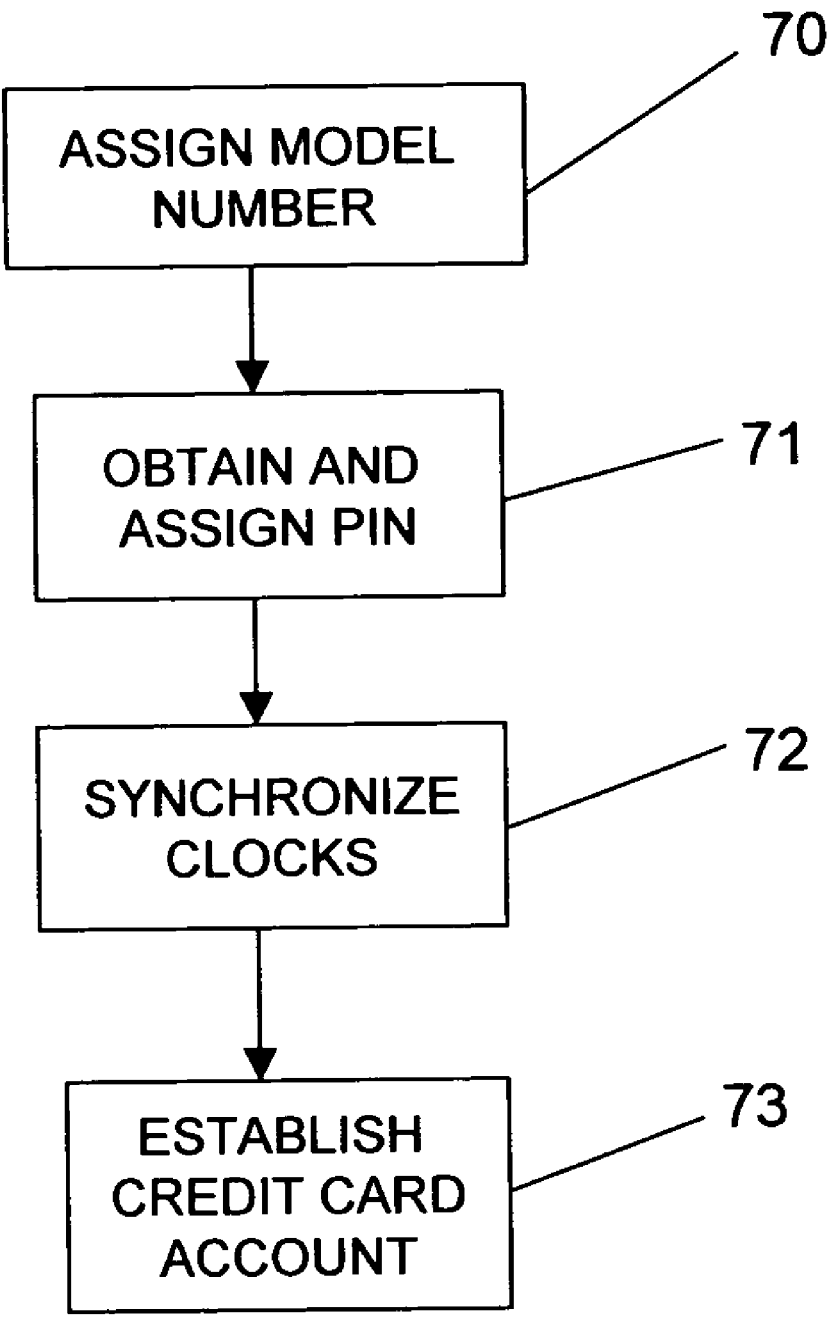
FIG. 8 is a flowchart of a routine for the validating and assigning a credit card protective device to a card holder by the bank.

FIG. 8 is a flowchart of a routine for the validating and assigning a credit card protection device 17 to a card holder. The routine starts at 70 wherein the financial institution such as a bank assigns a model number to the credit card protective device as described. At 71, the bank then obtains the PIN of the card holder using one of the schemes described and assigns the PIN to the credit card protective device. At 72, the clock 19 and the clock 13 are synchronized. At 73 the bank establishes a credit card account associated with the credit card protective device, as described.

Figure 9:
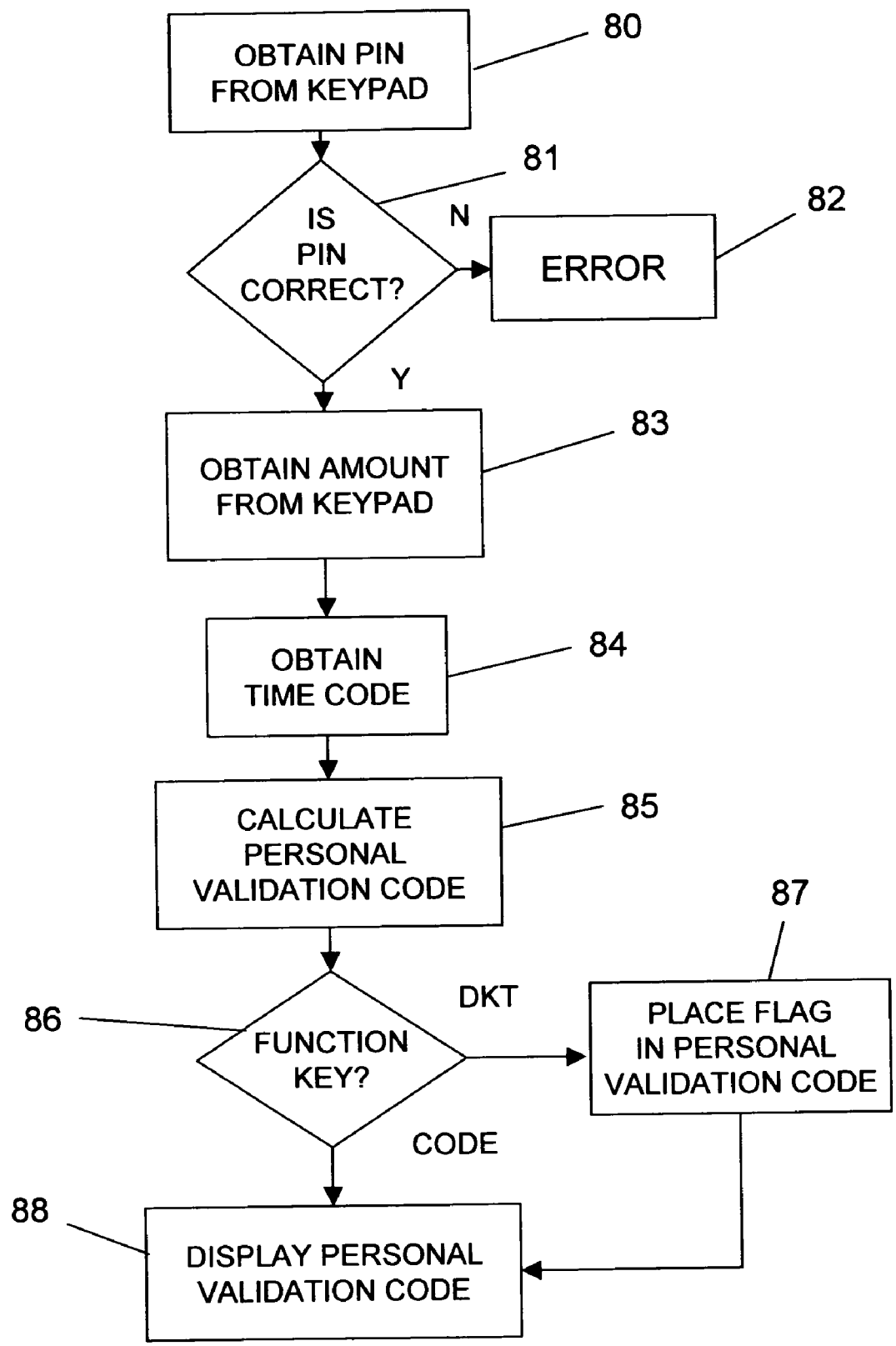
FIG. 9 is a flowchart of a routine the credit card protective device uses to determine and display a personal validation code.

FIG. 9 is a flowchart of a routine the credit card protective device uses to determine and display a personal validation code. At 80, the device obtains a PIN from the keypad 32. At 81, a check is made to determine if the PIN is correct. If the PIN is not correct, the routine indicates a error at 82, and stops the program. If the PIN is correct, at 83, the device obtains the amount of the purchase from the keypad. At 84, the device obtains the time code as discussed. At 85, the device calculates the personal validation code as described. At 86, the device determines which function key has been pushed. If the function key is the DTK key 34, a flag is placed in the personal validation code at 87. It the function key is CODE key 36, no flag is inserted into the personal validation code. At 88 the personal validation code is displayed to be given to the merchant, as discussed.

Figure 10:
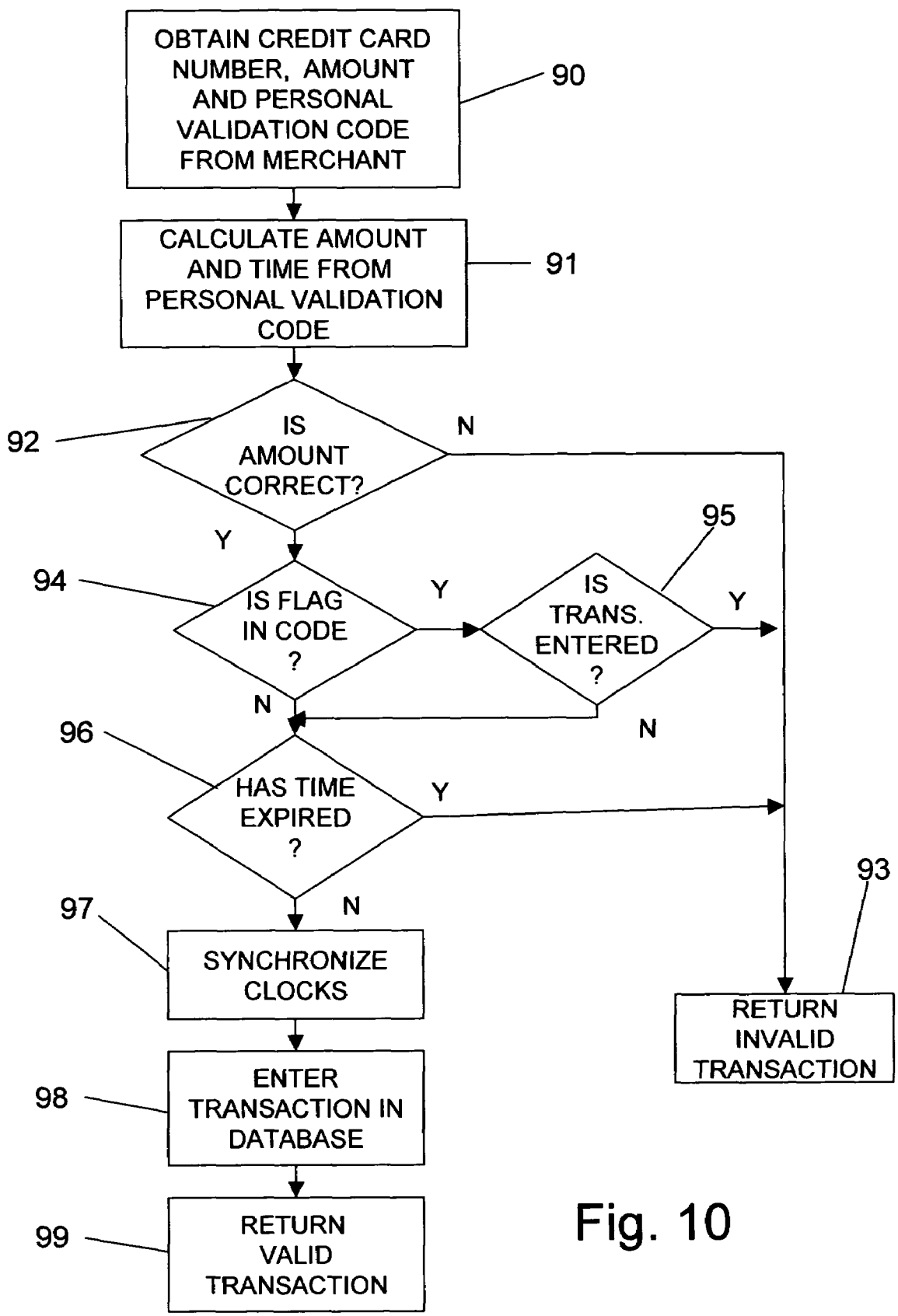
FIG. 10 is a flowchart of the routine the bank's computer uses to validate the transaction using the code transmitted by the credit card protective device The detailed description explains the preferred embodiments of the invention, together with advantages and features, by way of example with reference to the drawings.

FIG. 10 is a flowchart of the routine the bank's computer uses to validate the transaction using the code transmitted by the credit card protective device 17. At 90, the routine obtains the credit card number, amount and personal validation code from the merchant, as described. It will be understood that the merchant may be a merchant providing goods or services, an ATM, or an internet vendor, as described. At 91, the routine calculates the time and amount purchased from the personal validation code, as described. At 92, a check is made to determine if the amount is correct. If the amount is not correct, at 93, the routine returns an invalid transaction message to the merchant. If the amount is correct at 92, a check is made at 94 to determine if a flag is in the code. If a flag is in the code, the code was created with the DTK function key 34, as described. A check is made at 95 to determine if this transaction has previously been entered. If yes, an invalid transaction message is returned at 93. If no at 94 or no at 95, a check is made at 96 to see if a preset time has expired, as explained. If the time has expired, an invalid transaction message is returned at 93. If the time has not expired, at 97, the clock reading at the bank is synchronized with the clock reading in the credit card protection device. At 98, the transaction is entered in the database 14, and a valid transaction message is returned at 99.

From the forgoing statement, summary and description in accordance with the present invention, it is understood that the same are not limited thereto, but are susceptible to various changes and modification as known to those skilled in the art and I therefore do not wish to be limited to the details shown and described herein, but intend to cover all such changes and modifications which would be encompassed by the scope of the enclosed documents.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

What is claimed is:

1. A method for validating a credit card transaction comprising:
   receiving a validation number from a merchant along with a credit card number and a reported amount of purchase, said validation number generated based on a combination of a clock time code, a Personal Identification Number (PIN) and an actual amount of purchase;
   said clock time code representing a clock time of said transaction;
   generating a matching time code equal to said clock time code;
   validating that the reported amount of purchase and actual amount of purchase agree with one another by using the validation number, matching time code and PIN; and
   authorizing the transaction based on the validation that the reported amount of purchase and actual amount of purchase agree with one another, said authorizing comprising a financial institution sending an authorization for said credit card transaction to said merchant;
   wherein a dollar amount of the actual amount of purchase is computed based on the validation number, matching time code and PIN.

2. The method of claim 1, wherein the PIN is not disclosed to the merchant.

3. The method of claim 1, wherein the validation number is coded to prevent generation by unauthorized persons.

4. The method of claim 3, further including a plurality of transactions, wherein the validation number is different for each transaction of said plurality of transactions.

5. The method of claim 3, further including a duplicate transaction of said transaction, wherein the validation number for the duplicate transaction includes information to communicate that said duplicate transaction is a duplication of said transaction.

6. The method of claim 3, wherein the authorizing step is performed by a financial institution and said validation number is generated by a process known to said financial institution.

7. The method of claim 6, wherein multiple transactions are authorized for multiple respective card holders and the process is unique for each respective card holder.

8. The method of claim 3, wherein the validation number is three or four digits.

9. The method of claim 1, wherein said actual amount of purchase is provided to a credit card holder by said merchant.

10. The method of claim 1, wherein the validation number is provided to the merchant by a credit card holder.

11. The method of claim 1, wherein the validation number is received over a telephone line.

12. The method of claim 1, wherein the validation number is further based on additional information.

13. The method of claim 12, wherein the additional information includes at least one of a social security number, or a person's birth date.

14. The method of claim 1, further including the steps of:
   synchronizing the clock time code and the matching time code by comparing the reported amount of purchase and actual amount of purchase; and
   predicting clock drift between the clock time code and matching time code.

* * * * *